United States Patent [19]
Stein

[11] 4,337,381
[45] Jun. 29, 1982

[54] CLIP-ON ELECTRIC LOCK AND SWITCHING DEVICE FOR TELEPHONE

[76] Inventor: Jeffrey D. Stein, 3528 Merrimac Ave., San Diego, Calif. 92117

[21] Appl. No.: 129,387

[22] Filed: Mar. 11, 1980

[51] Int. Cl.³ .............................................. H04M 1/21
[52] U.S. Cl. ................................. 179/178; 179/81 C; 179/99 H
[58] Field of Search ................... 179/160, 178, 146 R, 179/189 R, 99 H, 99 R, 81 R, 2 C, 1 C, 7 R, 7.1 R, 2 TC, 100 D, 81 C, 84 L; D14/59; 200/314

[56] References Cited

U.S. PATENT DOCUMENTS

| | | | |
|---|---|---|---|
| 2,558,661 | 6/1951 | Murray | 179/178 |
| 2,624,965 | 1/1953 | Griswold | 179/178 X |
| 3,170,359 | 2/1965 | Mourra | 179/146 R X |
| 3,472,966 | 10/1969 | Simmons | 179/178 X |
| 4,011,413 | 3/1977 | Phillips | 179/81 R |
| 4,045,619 | 8/1977 | Harrington | 179/18 DA |
| 4,061,888 | 12/1977 | Rasmussen | 179/100 D |
| 4,258,232 | 3/1981 | Smith et al. | 179/99 R |

Primary Examiner—Thomas W. Brown
Attorney, Agent, or Firm—Fischer, Tachner & Strauss

[57] ABSTRACT

A housing for containing accessory controls for an associated telephone mountable within the cradle of the telephone which conforms with the contour of the telephone and has positioned within the housing a card for selectively controlling the circuitry of the telephone.

10 Claims, 6 Drawing Figures

CLIP-ON ELECTRIC LOCK AND SWITCHING DEVICE FOR TELEPHONE

BACKGROUND OF THE INVENTION

This invention is directed to telephones and more particularly, to rotary dial or push-button types which complete a call by making desired connections at a telephone central office. For purposes of illustration, a push-button telephone will be referred to. However, the comments relate as well to a rotary (dial) type. With regard to the push-button type, by pressing and releasing a plurality of plungers on a numerical face plate on a telephone, a corresponding plurality of different tones or frequencies are respectively generated on the subscriber's line, the number called depending upon the tones created by the various plungers depressed and released. The electrical tones or frequencies thus generated are transmitted to the central office where they control the movement of an electromechanical device called a selector through which the subscriber's line is connected to other selective mechanisms. Each successive digit formed by the plungers produces another series of such tones which advance the call one step toward completion until the final operation occurs whereby connection is made to the called telephone.

The use of Touch Tone push-button telephones is being gradually extended in this country and in all parts of the world. Additionally, the Touch Tone telephones are so perfected that toll calls can be made directly by the caller or subscriber through new central station equipment. However, the subscriber may not authorize the caller to make such toll or local calls and thus he is charged for calls he knows nothing about.

Further, it is desirable to utilize the telephone to control incoming calls so that they can be switched to other necessary circuits if desired.

DESCRIPTION OF THE PRIOR ART

Although locks for telephones have been known for controlling incoming and outgoing calls, none have been easily installed on a telephone in a clip-on manner which also is adaptable to provide a switching function.

U.S. Pat. No. De. 230,737 discloses an add-on device for locking Touch Tone telephones.

U.S. Pat. No. 3,780,234 discloses an add-on lock for press-button telephones which prohibits the transmission of outgoing telephone calls on a Touch Tone telephone without interfering with incoming calls.

U.S. Pat. No. 3,581,019 discloses a card control for a radio-telephone facility employing a matrix circuit which receives a card for completing, transmitting and receiving circuits therefor.

U.S. Pat. No. 3,959,607 discloses a communication booth for use as a local office by traveling salesmen, businessmen and the like with access to and exit from the booth being controlled by an electronic credit card operated lock system.

SUMMARY OF THE INVENTION

In accordance with the invention claimed a new locking and switching method and apparatus for telephones is provided which selectively may lock the telephone so that no outgoing calls may be made while permitting incoming calls to be made to either the original telephone and/or to an accessory telephone circuit.

It is, therefore, one object of this invention to provide an improved locking method and apparatus for telephones which when installed on the telephone prohibits all outgoing calls without prohibiting incoming calls.

Another object of this invention is to provide a locking mechanism for telephones which snugly fits into the cradle of present-day telephone housings.

A further object of this invention is to provide an improved telephone locking and/or switching mechanism which interlocks with a cavity in the present-day telephones, avoiding easy removal and tampering with the telephone.

A still further object of this invention is to provide an improved locking mechanism for telephones which may be readily attached to present telephones with a minimum of connections.

A still further object of this invention is to provide a simple housing for encasing either a locking or switching mechanism for fitting into a cavity of a telephone which is economical to manufacture and install.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawing in which.

DESCRIPTION OF THE PREFERRED EMBODIMENT

Figure 1:
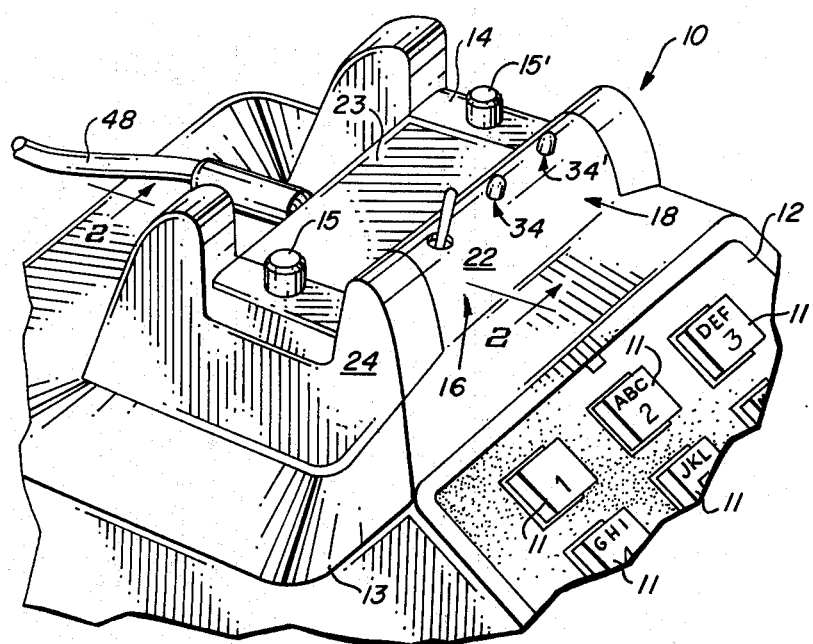
FIG. 1 is a partial perspective view of a Touch Tone telephone with the clip-on locking and/or switching device mounted in its cradle cavity.

Referring more particularly to the drawing by characters of reference, FIGS. 1–4 illustrate a Touch Tone type telephone 10 comprising the usual and well known transmitter and receiver of electrical impulses and converter of such impulses into audio sounds. Since telephone 10 is well known, it will not be described further except to note that the telephone has an electrical circuit interconnecting a source of power to the Touch Tone button type plungers 11 mounted on the face 12 of housing 13 of the telephone which can be interrupted by one or more on-off switches, if so desired, to control the transmission of electrical pulses from the telephone to a central station for transmission to other like telephones.

Although the telephone 10 does not have a hand set shown, such part of the telephone would be used and placed in the cradle 14 of housing 13 in a well known manner. The push-buttons 15, 15' when depressed by the hand set (not shown) position the telephone circuits in a condition for receiving incoming calls. In their upward positions shown, which they assume when the receiver is out of the cradle, they condition the circuits in the telephone for transmitting outwardly of the telephone and complete circuits for receiving and transmitting impulses convertible to audio sounds.

Figure 2:
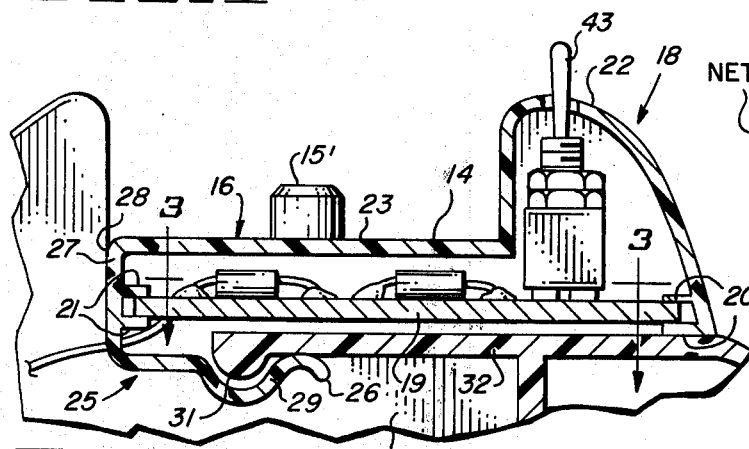
FIG. 2 is a cross-sectional view of FIG. 1 taken along the line 2—2.

In order to provide selective accessory connection with a given telephone as well as to prevent an unauthorized caller from calling out from a given Touch Tone telephone 10, a new clip-on lock and switching device 16 is interconnected with telephone 10 at the existing cradle 14 formed in the telephone housing 13, as shown in FIGS. 1 and 2 of the drawing.

The clip-on electronic lock and switching device comprises a housing 18 formed of a suitable plastic or like moldable material which at least partially encloses the electronic lock and selector switching device and employs suitable logic for accomplishing the locking or switching functions disclosed.

As shown in FIG. 2, a selector switching card 19 employing the logic for the various switching functions hereinafter explained comprises a flat card shown also in FIG. 3 which is mounted in the base of the housing between pairs of cooperating ridges 20 and 21 at opposite ends of housing 18. Housing 18 comprises a shell-like hollow configuration having a ridged end 22 projecting upwardly from a relatively flat top surface 23. The ridged end 22 is conformed to fit between and complete the shape of projections 24 forming a part of cradle 14. At the end of surface 23 of housing 18 opposite to its ridged end 22, the housing is provided with a clip configuration 25. This clip configuration comprises a leg member 26 forming a part of the extended surface 27 of end 28 of housing 18 which is reverse bent to extend juxtapositioned to and spaced from the bottom surface of switching card 19 in the manner shown in FIGS. 2 and 6. The leg member 26 of clip configuration 25 is provided with a distortion or groove 29 extending across at least a part of the width of clip configuration 25 and partially surrounds and interlocks with a bend or protrusion 31 formed on a ledge 32. Ledge 32 projects into a cavity 17 that is formed below the cradle 14 at the housing 13 of telephone 10. Thus, the clip configuration of housing 18 can be moved longitudinally into cavity 17 of housing 13 so as to detachably connect housing 18 to housing 13 in such an arrangement that the surface 27 of housing 18 forms substantially an extension of the outer surface or contour of projection 24 of housing 13.

As shown in FIG. 2, the bottom of switching card 19 is mounted flush to the bottom of the cradle for the telephone and is kept in place by spring tension created by the memory of the plastic material from which housing 18 and particularly leg member 26 are formed.

It should be noted that housing 18 of the clip-on device 16 is intended to provide a plurality of discrete functions depending on the electronic gear and logic mounted on the switching card 19 or modifications thereof.

Figure 6:
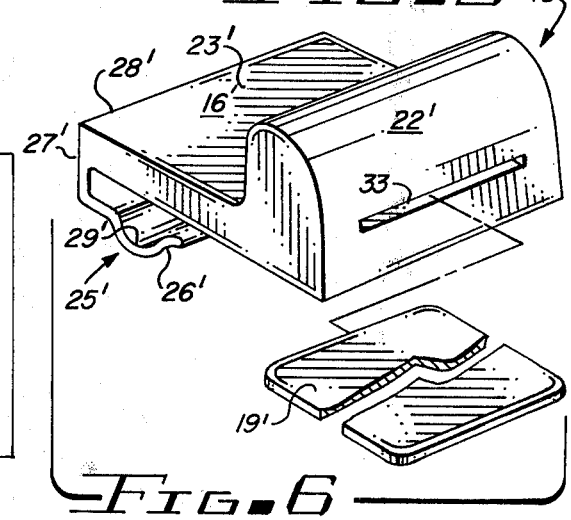
FIG. 6 is an exploded perspective view of a modification of the clip-on device shown in FIG. 1 employing an insertable logic controlling card.

As shown in FIG. 6, housing 18' of the clip-on device 16' is modified to receive a logic bearing card 19' through a slot 33 formed in the ridged end 22' of the housing. This card is intended to guard the telephone against unauthorized use and makes and breaks an electric circuit in a well known manner by its movement into and out of slot 33. A pair of lead wires, not shown in FIG. 6, connect the plungers 11 to the telephone circuitry through a circuit on the switch card 19' when the card is in the slot 33 of housing 18' and is broken when the card is removed from slot 33 in housing 18'.

It should be noted when the clip-on device of FIG. 6 is utilized, card 19, shown in FIG. 2, does not comprise a part of the structure.

With regard to card 19 and its function in housing 18, this card may provide the discrete function of enabling the receiver of a call on a single line telephone to place the caller "on hold" and to switch the caller onto an extension of this single line telephone. To operate the telephone to accomplish this option, the called party having the clip-on device installed on his telephone merely depresses a light emitting diode (LED) push-button switch 34' as he hangs up his telephone handset. This push-button switch 34 or 34' illuminates to indicate that the holding circuit is engaged and will extinguish when any extension is picked up.

Figure 5:
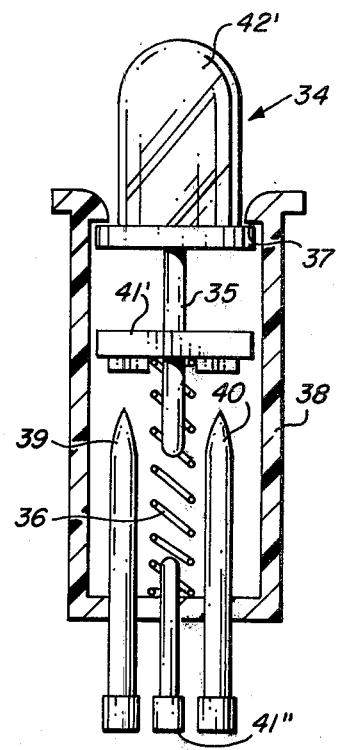
FIG. 5 is a cross-sectional view of one of the switches shown in FIG. 1.
Figure 3:
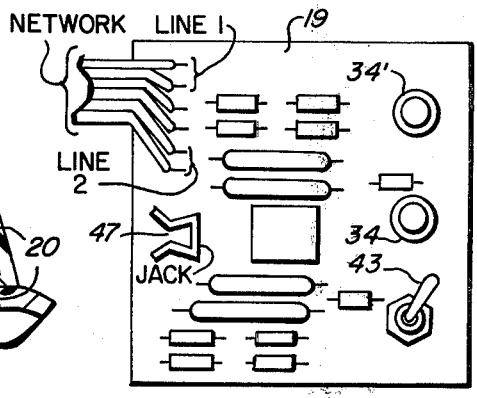
FIG. 3 is a diagrammatic top view of the logic card shown in FIG. 2.

FIG. 5 is a cross-sectional view of one of the push-button LED switches 34, 34' shown in FIGS. 1 and 3. Each switch comprises a plunger 41' employing a pair of juxtapositioned rods serving as conductors 35, only one of which being shown. Conductor rods 35 are spring biased with the plunger 41' to the circuit open position shown in the drawing against an internal ledge 37 of its housing 38 by a pair of coil springs 36, only one of which being shown. A pair of contacts 39 and 40 are interconnected by a bridging member forming a part of plunger 41' when plunger 41' is depressed against the bias of spring 36, only one of which being shown. Dome 42' of the LED switch is illuminated when plunger 41' is depressed and its bridging member makes contact with contacts 39 and 40. Coil springs 36 serve as conductors for interconnecting conductors 35 and 41'' of each of the LED switches 34, 34' in the manner shown in FIG. 4.

Figure 4:
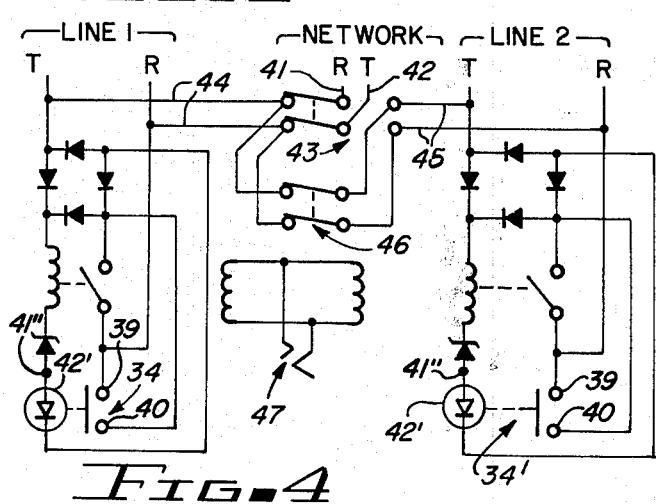
FIG. 4 is a circuit diagram of the logic shown in FIG. 3.

FIG. 4 illustrates that the network system of the telephone is connected to the telephone company's circuit (not shown) through lines 41 and 42, respectively. A double throw toggle switch 43 connected to the network system connects the network to either line 1 or line 2 depending on the line selected by the user of the telephone set through circuits 44 and 45, respectively.

It should be noted that the logic shown for the lines 1 and 2 are identical but they could be different if so desired. The second hold line is connectable to either an outside line or an inside intercom line through a second two position toggle switch 46 or to connect both outside lines to the called telephone. The remaining logic for line 2 comprises similar logic components as in line 1 including the push-button switch 34'.

An optional 3.5 mm jack 47 is installed in the rear of the clip on device 16, as shown in FIGS. 1, 3 and 4, for providing a means for connecting through cable 48 a radio or cassette player (not shown) into the clip-on device for providing music to the caller when he or she is temporarily placed "on hold".

Although the logic for accomplishing the various switching functions of the clip-on device 16 are well known functions, it is believed to be novel to accomplish these discrete functions by the disclosed simple but efficient clip-on device which fits into the cradle of a telephone and requires a minimum of changes or interruptions to the normal telephone's connection to the telephone network.

When the clip-on device is modified, as shown in FIG. 6, the card 19' merely comprises a switching function to either complete the telephone network connection to the telephone circuits when the card is inserted in the housing 18' or to interrupt the circuitry when the card is removed from slot 33 in housing 18'.

Although but a few embodiments of the present invention have been illustrated and described, it will be apparent to those skilled in the art that various changes and modifications may be made therein without departing from the spirit of the invention or from the scope of the appended claims.

What is claimed is:

1. For a telephone having a cradle, said cradle including a ledge above which a handset is to be placed, a device to be interconnected at said cradle to permit control of the operation of the telephone, said control device comprising;

a housing for receiving the telephone handset thereupon, said housing having a top and a bottom, the bottom of said housing being positionable adjacent said cradle ledge and the top of said housing having an arcuate ridge extending completely across a first end thereof to form a substantially uniform extension and completion of the outline of a corresponding first end of said cradle, circuit means being located within said housing and electrically connected to the circuits of said telephone to permit selective control of the operation thereof, switch means extending through said acruate ridge and electrically interconnected with said circuit means, said switch means being selectively operable to activate said circuit means and thereby control the operation of said telephone circuits, and indicating means extending through said arcuate ridge and electrically interconnected with said circuit means in order to provide a visual indication when said switch means is operated and said circuit means is activated.

2. The telephone control device recited in claim 1, wherein said housing has a leg member formed at a second end thereof, said leg member extending along the bottom of said housing and being in spaced proximity thereto, so that said cradle ledge is received in the space between said leg member and the bottom of said housing for detachably connecting said housing at the cradle of said telephone.

3. The telephone control device recited in claim 1, wherein said indicating means includes a light emitting diode.

4. The telephone control device recited in claim 1, wherein said circuit means includes means by which to condition the telephone circuits to place an existing telephone call on hold, in order that the telephone handset can be returned to the cradle without disconnecting said call.

5. The telephone control device recited in claim 1, wherein said circuit means includes means by which to condition the telephone circuits of the telephone to switch an existing telephone call to the circuits of an extension of said telephone.

6. The telephone control device recited in claim 1, wherein said circuit means includes a jack which is adapted to be connected to a source of music, so that the music can be supplied to the telephone circuits and to the maker of a telephone call.

7. For a telephone having a handset and a cradle, said cradle including pairs of projections respectively formed at opposite sides thereof and a ledge formed between said oppositely disposed pairs of projections, a device to be removably attached at said telephone cradle for receiving the telephone handset and for controlling the telephone circuits, said device comprising:

a housing having a top and a bottom, the bottom of said housing being positioned adjacent said cradle ledge, the top of said housing having an arcuate ridge extending completely across a first end thereof, said arcuate ridge being aligned with and positioned between one of the projections which forms each of the pairs thereof, so as to extend the outline of said projections across a corresponding first end of said cradle, circuit means located within said housing and electrically connected to the circuits of the telephone to control the operation thereof, and switch means extending through the arcuate ridge at the top of said housing and electrically interconnected with said circuit means, said switch means being selectively operable to activate said circuit means and thereby control the operation of said telephone circuits.

8. The telephone control device recited in claim 7, wherein said switch means includes indicating means by which to provide an indication when said switch means is selectively operated and said circuit means is activated.

9. The telephone control device recited in claim 8, wherein said indicating means includes a light emitting diode for providing a visual indication when said switch means is operated and said circuit means is activated.

10. The telephone control device recited in claim 7, wherein the second end of said housing thereof includes a leg member extending along the bottom of said housing and being in spaced proximity thereto, whereby the ledge of said cradle is received in the space between said leg member and the bottom of said housing for detachably connecting said housing at the cradle of said telephone.

* * * * *